(12) United States Patent
Alluigi et al.

(10) Patent No.: US 8,870,033 B2
(45) Date of Patent: Oct. 28, 2014

(54) TRIGGER DISPENSER

(75) Inventors: Riccardo Alluigi, Alessandria (IT); Stephen R. Dennis, Danville, CA (US)

(73) Assignee: Guala Dispensing S.p.A., Alessandria (IT)

( * ) Notice: Subject to any disclaimer, the term of this patent is extended or adjusted under 35 U.S.C. 154(b) by 0 days.

(21) Appl. No.: 13/821,685

(22) PCT Filed: Apr. 7, 2011

(86) PCT No.: PCT/IB2011/051496
§ 371 (c)(1),
(2), (4) Date: Mar. 8, 2013

(87) PCT Pub. No.: WO2012/035445
PCT Pub. Date: Mar. 22, 2012

(65) Prior Publication Data
US 2013/0161359 A1    Jun. 27, 2013

(30) Foreign Application Priority Data

Sep. 16, 2010  (IT) ............................... BS2010A0155

(51) Int. Cl.
| | |
|---|---|
| *B67D 7/58* | (2010.01) |
| *G01F 11/00* | (2006.01) |
| *B05B 11/00* | (2006.01) |
| *G01F 11/02* | (2006.01) |
| *B05B 15/06* | (2006.01) |
| *B05B 15/00* | (2006.01) |

(52) U.S. Cl.
CPC ......... *B05B 11/3011* (2013.01); *B05B 11/3045* (2013.01); *B05B 11/0067* (2013.01); *G01F 11/028* (2013.01); *B05B 11/0037* (2013.01); *B05B 15/066* (2013.01); *B05B 11/3069* (2013.01); *B05B 15/005* (2013.01); *B05B 11/0016* (2013.01)

USPC .................... 222/383.1; 222/382; 222/340

(58) Field of Classification Search
USPC ............ 222/383.1, 382, 464.1, 340, 207, 211
See application file for complete search history.

(56) References Cited

U.S. PATENT DOCUMENTS 4,191,313 A * 3/1980 Blake et al. .................... 222/335
4,863,071 A   9/1989 Guss et al.
(Continued)

FOREIGN PATENT DOCUMENTS

DE    83 11 429 U1    9/1983
EP    0 202 464 A1    11/1986
(Continued)

OTHER PUBLICATIONS

International Search Report for PCT/IB2011/051496, mailed Aug. 2, 2011; ISA/EP.

(Continued)

*Primary Examiner* — Kevin P Shaver
*Assistant Examiner* — Nicholas J Weiss
(74) *Attorney, Agent, or Firm* — Harness, Dickey & Pierce, PLC

(57) ABSTRACT

A trigger dispenser device (1) envisages a secondary liquid aspiration duct (50) in communication with the dispenser duct, and a primary liquid aspiration duct (8) in communication with the container, off-axis with each other. Between these, a joining compartment (64) is provided communicating upstream with the primary liquid aspiration duct (8) and communicating downstream with the secondary liquid aspiration duct (50) to form the fluidic connection between them. In particular, the container (C) is of the type with built-in suction pipe.

19 Claims, 5 Drawing Sheets

(56) References Cited

U.S. PATENT DOCUMENTS

| | | | | |
|---|---|---|---|---|
| 5,244,126 | A * | 9/1993 | Geier | 222/383.1 |
| 5,439,141 | A * | 8/1995 | Clark et al. | 222/136 |
| 5,540,360 | A * | 7/1996 | Foster et al. | 222/376 |
| 5,709,325 | A * | 1/1998 | Renault et al. | 222/383.1 |
| 5,887,763 | A * | 3/1999 | Foster | 222/383.1 |
| 5,906,301 | A * | 5/1999 | Foster | 222/383.1 |
| 7,938,299 | B2 * | 5/2011 | Fahy et al. | 222/382 |
| 8,245,887 | B2 * | 8/2012 | Ohshima | 222/383.1 |
| 8,408,429 | B2 * | 4/2013 | Dennis | 222/382 |
| 2006/0086759 | A1 | 4/2006 | Herzog | |
| 2007/0295757 | A1 | 12/2007 | Foster et al. | |
| 2009/0212077 | A1 * | 8/2009 | Carden | 222/382 |
| 2012/0234870 | A1 * | 9/2012 | Good et al. | 222/382 |

FOREIGN PATENT DOCUMENTS

| | | |
|---|---|---|
| EP | 2 020 264 A2 | 2/2009 |
| WO | WO-2011/020009 A1 | 2/2011 |

OTHER PUBLICATIONS

International Preliminary Report on Patentability for PCT/IB2011/051496 mailed Sep. 28, 2012; IPEA/IP.

* cited by examiner

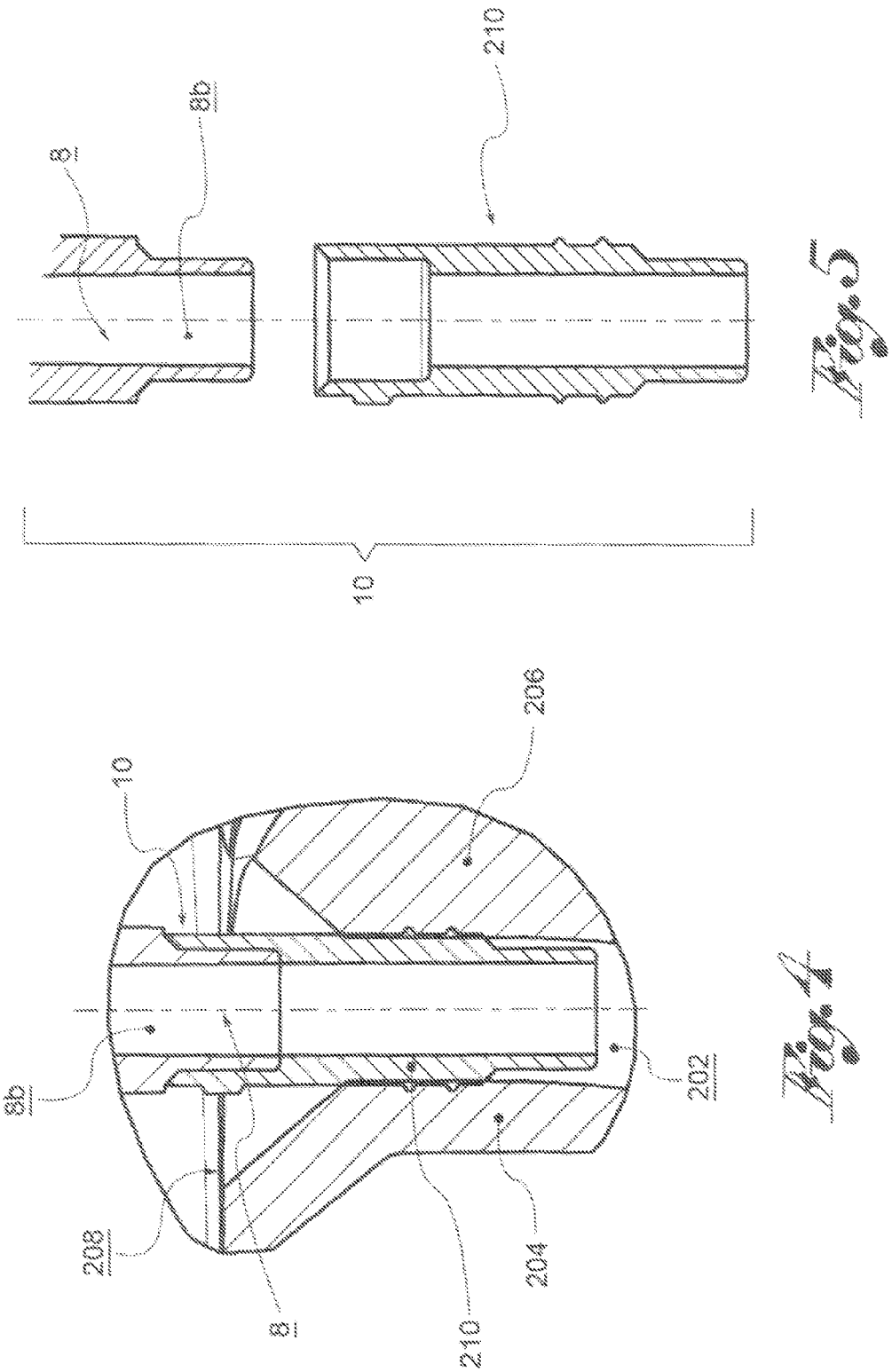

TRIGGER DISPENSER

CROSS-REFERENCE TO RELATED APPLICATIONS

This application is a 371 U.S. National Stage of International Application No. PCT/IB2011/051496, filed Apr. 7, 2011, and claims priority to Italian patent application No. BS2010A000155, filed Sep. 16, 2010, the disclosures of which are herein incorporated by reference in their entirety.

FIELD

The present invention relates to a manually operated dispenser device of a liquid, generally trigger-operated.

BACKGROUND

Such dispenser devices, known as in the trade "trigger pumps", are extremely widespread, with an annual production of several hundred million pieces. They are in fact widely used in the household cleaning sector, for treating fabrics and in the world of hobbies etc.

For the production of such devices to economically worthwhile, the plants need to be able to produce and assemble an extremely large number of pieces. Consequently, even slight improvements to the production process of the components and in the assembly process of the same may entail significant economic benefits.

In particular, it is essential that the device is easy to assemble even when it has internal components which are asymmetric or off axis.

All this must necessarily marry with increasingly restrictive requirements regarding functionality of the devices, reliability and the type of jet dispensed.

SUMMARY

The purpose of the present invention is to realise a manually operated dispenser device of a liquid, in particular trigger-operated, which satisfies the aforesaid requirements.

BRIEF DESCRIPTION OF THE DRAWINGS

The characteristics and advantages of the dispenser device according to the present invention will be evident from the following description, made by way of a non-limiting example, with reference to the attached drawings, wherein:

FIG. 4 shows an enlargement of the detail IV in FIG. 3;

FIG. 5 shows the detail of FIG. 4, in separate parts;

DETAILED DESCRIPTION

Figure 1:
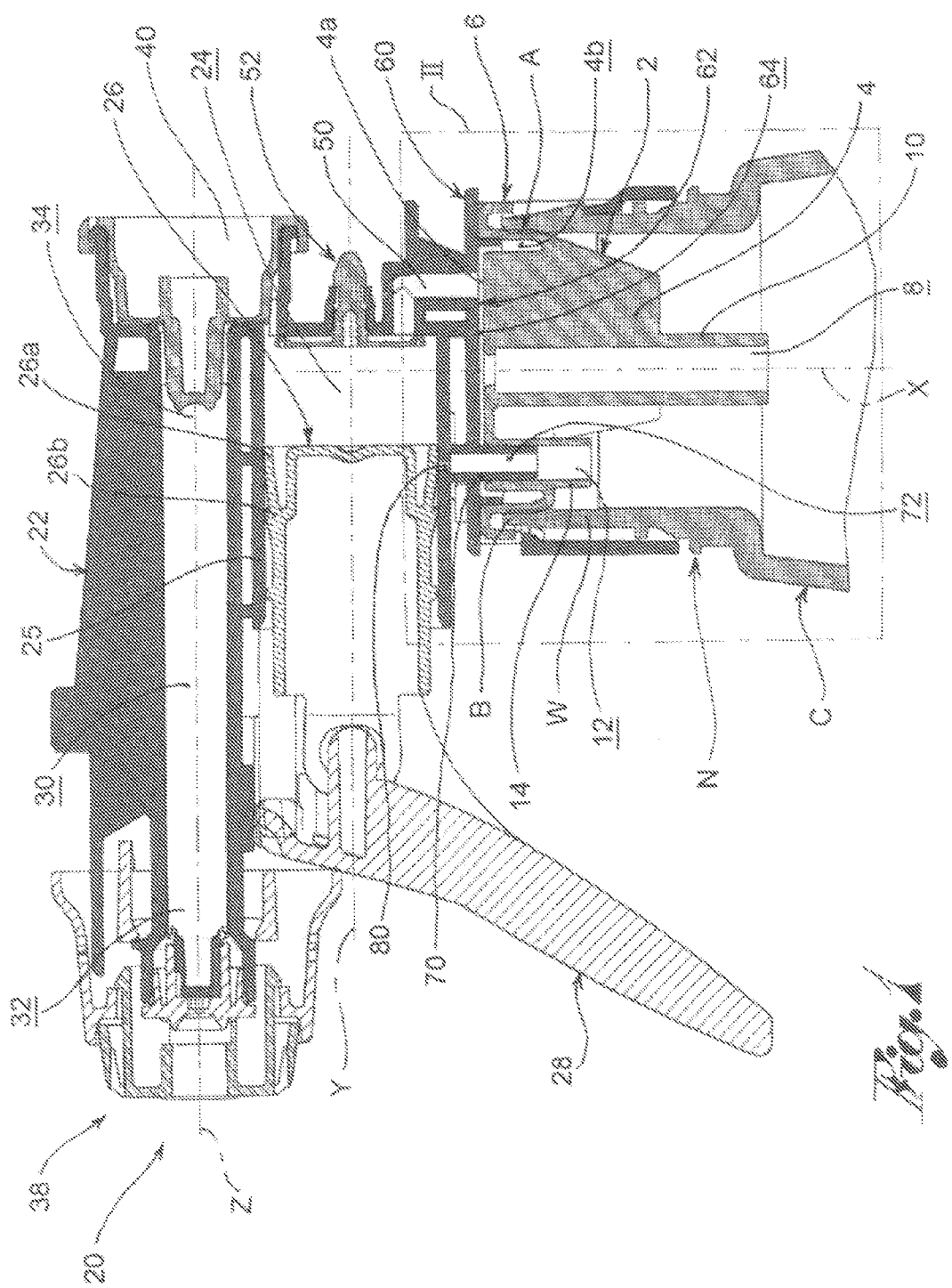
FIG. 1 shows a cross-section view of the dispenser device according to the present invention, according to a first embodiment.
Figure 2:
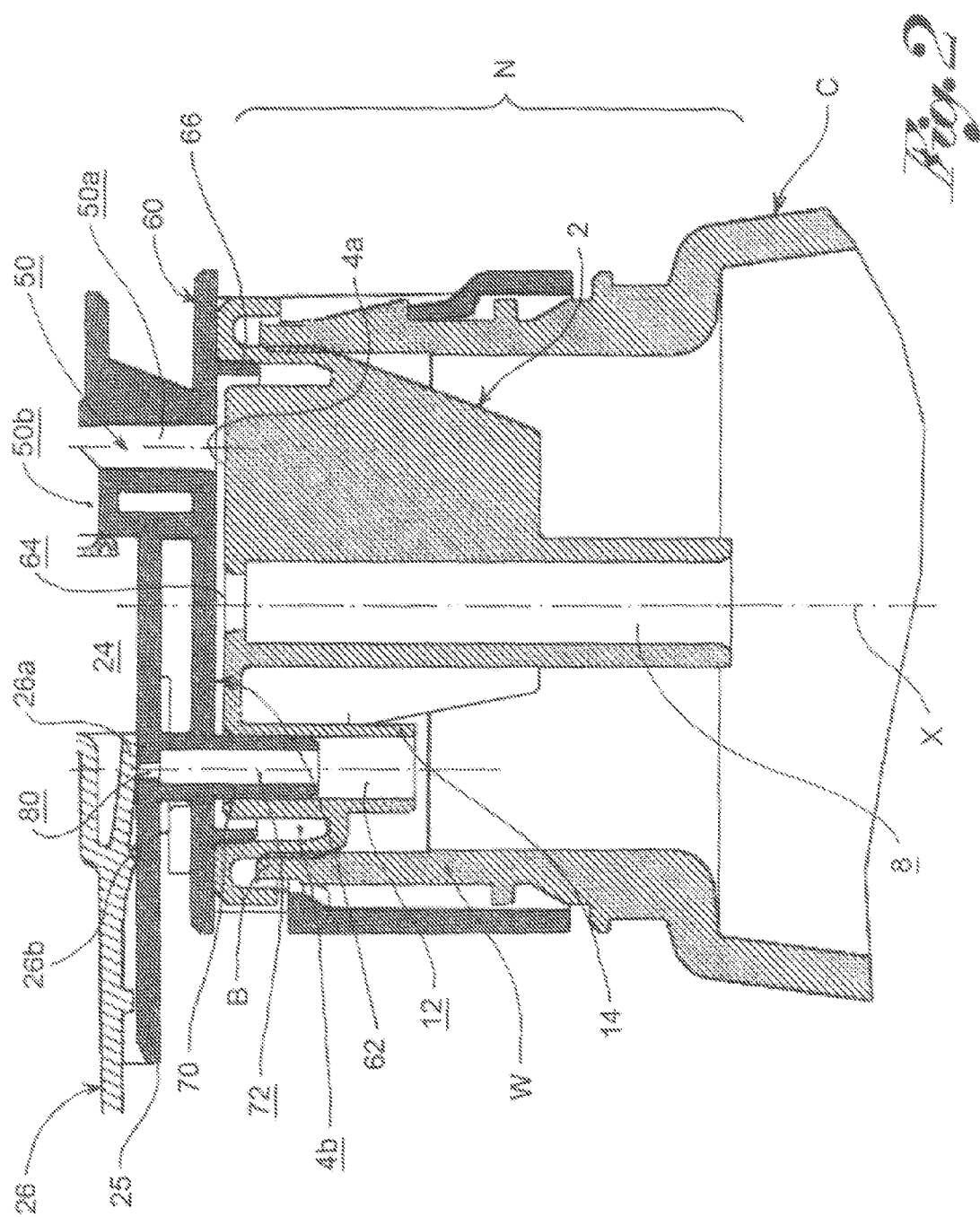
FIG. 2 shows an enlargement of the area II in FIG. 1.
Figure 3:
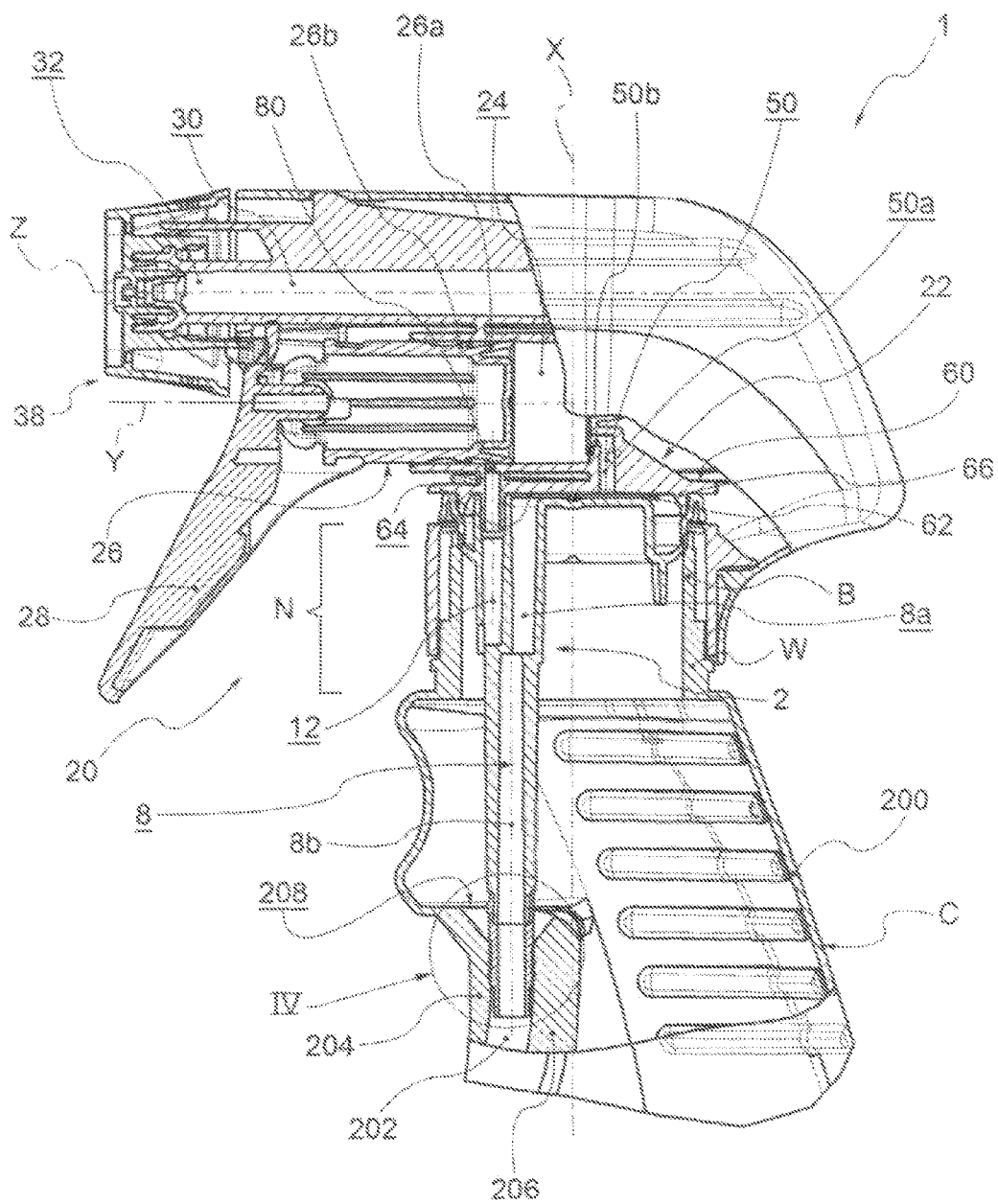
FIG. 3 shows a cross-section view of a dispenser device according to the present invention, according to a further embodiment.
Figure 6:
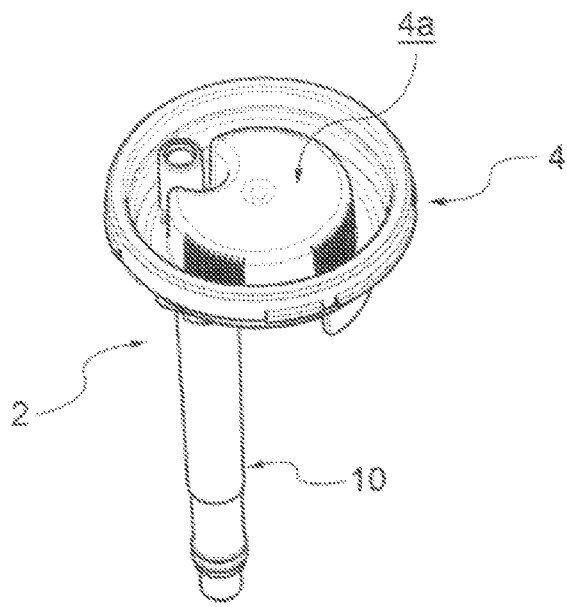
FIG. 6 shows an auxiliary body of the device in FIG. 3.
Figures 7, 8:
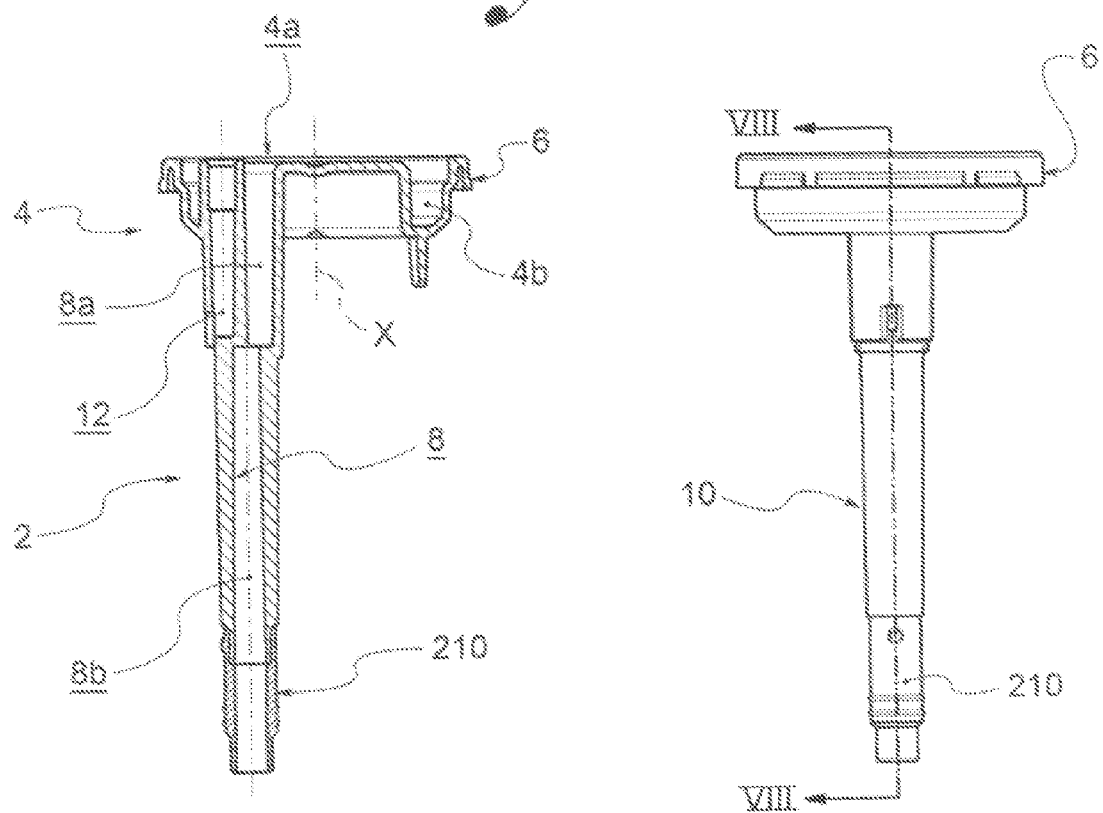
FIG. 7 shows a front view of the auxiliary body in FIG. 6.
FIG. 8 shows a cross-section view of the auxiliary body in FIG. 7, taken along the section line VIII in FIG. 7.

With reference to the appended drawings, reference numeral 1 globally denotes a manually operated dispenser device of a liquid.

The dispenser device comprises a container C to contain the liquid to be dispensed, comprising a neck N made by an annular wall W around a container axis X, which defines by means of an annular rim B, a container aperture A for access to the inside of the same.

The dispenser device 1 comprises a dispenser head 20 attached to the container C to manually aspirate the liquid from the container and dispense it to the outside.

The head 20 is pre-assembled and in general sent for filling of the container separately from it. After filling the container with liquid, the head is coupled to the container.

The head 20 further comprises an auxiliary body 2 attached to the neck N of the container C, at the aperture A of the same, to close it peripherally forming a seal.

In particular, the auxiliary body 2 comprises a main portion 4, inserted through the aperture A in the neck N, provided with a main surface 4a which remains external, and an annular collar 6, overlapping the annular rim B of the neck N, for example folded so as to straddle said annular rim B.

Preferably, the auxiliary body 2 has, on the outer side, an annular groove 4b which surrounds the main surface 4a.

The auxiliary body 2 has a primary liquid aspiration duct 8 extending along the container axis X; coaxial to said container axis X.

In one embodiment variation, the primary liquid aspiration duct 8 is eccentric to the container axis X, that is radially distanced from it.

The primary liquid aspiration duct 8 passes through the thickness of the main portion 4, placing the compartment inside the container in communication with the main surface 4a.

In particular, preferably, the primary liquid aspiration duct 8 is defined through a first tube 10, coaxial to the container axis X.

Preferably, a flexible or rigid suction tube is connectable to the tube 10, which extends as far as the bottom of the container, to suck up the liquid.

Moreover, the auxiliary body 2 has a primary air aspiration duct 12, radially distanced from the primary liquid aspiration duct 8, passing through the thickness of the main portion 4, to place the outer environment or main surface 4a in communication with the compartment inside the container.

In particular, preferably, the primary air aspiration duct 12 is defined through a second tube 14, radially distanced from the first tube 10.

Moreover, the head 20 comprises a frame 22 to support the other components and form some passages for the liquid. The auxiliary body 2 is attached to the frame 22.

The frame 22 has a pressure chamber 24, annularly defined by a chamber wall 25, extending along a pressure axis Y, preferably incident to the container axis X, for example orthogonally.

The head 20 comprises a piston 26, sealingly sliding in the pressure chamber 24 along the pressure axis Y, between a rest position, wherein the volume of the pressure chamber 24 is maximum, and a limit dispensing position, wherein the volume of the pressure chamber 24 is minimal, passing through intermediate dispensing positions.

Preferably, the piston 26 comprises a head seal 26a and a tail seal 26b, distanced from the head seal along the pressure axis Y, for tightness between the piston and the chamber wall 25 in which it slides.

The head 20 further comprises manual actuation devices suitable to move the piston 26 manually in the pressure chamber 24.

Preferably, the actuation means comprise a trigger 28, suitable to act on the piston 26, for example anchored to it, and engaged with the frame 22, for example hinged so as to rotate with it or sliding in translation on it.

Preferably, moreover, the head 20 comprises elastic return means able to permanently influence the piston 26 or trigger 28 to return the piston 26 to the rest position.

The frame 22 further presents a dispenser duct 30 extending along a dispensing axis Z, between a distal extremity 32, at the aperture towards the outside, and an opposite proximal extremity 34.

Preferably, the pressure axis Y is parallel and separate from the dispenser axis Z.

The head 20 further comprises, preferably, a nozzle 38, attached to the distal extremity 32 of the dispenser duct 30, to enable dispensing of the liquid in the desired manner.

The pressure chamber 24 is suitable for being placed in fluidic communication with the dispenser duct 30.

In particular, the head 20 comprises valve dispenser means suitable for allowing the transit of liquid from the pressure chamber 24 to the dispenser duct 30 when, during the dispensing phase, the piston 26 moves from the rest position towards the dispenser limit position, and the liquid exceeds a predefined pressure threshold.

For example, the valve dispenser means comprise an elastically deformable diaphragm 40, attached to the frame 22.

Moreover, the frame 22 has a secondary liquid aspiration duct 50, which co-operates in the connection of the pressure chamber 24 with the compartment inside the container.

Preferably, the secondary liquid aspiration duct 50 comprises an axial section 50a, extending parallel to the container axis X, and a radial section 50b, extending parallel to the pressure axis Y of the pressure chamber 24. Following the movement of the liquid aspirated from the container towards the pressure chamber, the axial section 50a is upstream of the radial section 50b.

Moreover, the head 20 comprises valve dispenser means suitable for allowing the transit of liquid from the secondary aspiration duct 50 towards the pressure chamber 24 when, during a return phase, the piston 26 moves towards the rest position from the dispenser limit position, and prevents transit of the liquid from the pressure chamber 24 towards the secondary liquid aspiration duct 50 during said dispensing phase.

Preferably, said valve aspiration means comprise an elastically deformable aspiration diaphragm 52, fitted between the pressure chamber 24 and the secondary liquid aspiration duct 50.

The frame 22 comprises a support plate 60, by means of which the frame 22 engages with the auxiliary body 2.

The plate 60 has a functional surface 62 on the outside, which the secondary liquid aspiration duct 50 comes out on, in a radially distanced position from the container axis X that is at least partially misaligned from the primary liquid aspiration duct 8.

Preferably the secondary liquid aspiration duct 50, and in particular the axial section 50a of the same, is on the opposite side to the secondary air aspiration duct 72 in relation to the container axis X.

When the head 20 is attached to the container, the functional surface 62 of the frame 22 is axially distanced from the main surface 4a of the auxiliary body 2, so that a joining compartment or duct 64 is formed between these, which connects the main liquid aspiration duct 8 of the auxiliary body 2 with the secondary liquid aspiration duct 50 of the frame 22.

The primary liquid aspiration duct 8, the joining compartment 64 and the secondary liquid aspiration duct 50 thereby form a liquid aspiration passage which places the compartment inside the container in communication with the pressure chamber 24 of the head 20.

Moreover, preferably, the frame 22 comprises an annular lip 66, projecting in the direction of the container axis X from the functional surface 62 of the plate 60, inserted in the groove 4b of the auxiliary body 2, to form a seal.

Moreover, the frame 22 comprises a tubular aspiration insert 70, projecting from the functional surface 62 and inserted so as to form a seal in the aspiration tube 14 of the auxiliary body 2, defining within it a secondary air aspiration duct 72. The insert 70 therefore crosses the joining compartment 64 destined for transit of the liquid.

The primary air aspiration duct 12 and the secondary air aspiration duct 72 are therefore in communication with each other and form a separate air, aspiration passage sealed from the liquid aspiration passage.

In particular, the secondary air aspiration duct 72 comprises an aspiration hole 80 made through the chamber wall 25.

Preferably, when the piston 26 is in the rest position, the hole 80 is separated from the pressure chamber 24 by the head seal 26a of the piston 26 and is separated from the outside environment by the tail seal 26b of the piston 26; when the piston 26 is in the dispensing limit position, the hole 80 is in communication with the outside environment, but is separated from the pressure chamber 24 by the tail seal 26b (and by the head seal 26a).

In an initial rest configuration, the piston 26 is in the rest position, the valve dispenser means are closed, the valve aspiration means are closed, the air aspiration passage towards the outside is closed; the presence of liquid to dispense in the pressure chamber 24 is presumed.

In the dispensing phase, the piston 26 completes a dispensing stroke from the rest position to the limit dispensing position by manual activation of the trigger 28.

By effect of the liquid in the pressure chamber 24, the liquid aspiration valve means remain closed, preventing the backflow of liquid towards the container.

By effect of the pressurised liquid, the valve dispenser means open, making the liquid travel from the pressure chamber 24 to the dispenser duct 30, thereby enabling dispensing from the nozzle 38.

When the trigger is released, the elastic return means move the piston 26 or the trigger 28 from the dispensing limit position towards the rest position.

In the return phase, the piston 26 performs a return stroke from the dispensing limit position towards the return position.

The negative pressure which is formed in the pressure chamber 24 closes the dispenser valve means. The negative pressure which is formed in the pressure chamber 24 opens the liquid aspiration valve means and the liquid transits from the compartment inside the container into the pressure chamber 24, through the primary liquid aspiration duct 8, the joining compartment 64 and the secondary liquid aspiration duct 50.

At least for a part of the return phase, the air aspiration passage is in communication with the outside environment, so that the air can be aspirated into the compartment inside the container.

The air aspiration passage, and in particular the secondary air aspiration duct 72, is fluidically separated from the liquid aspiration passage, and in particular from the joining compartment 64, so that there is no leakage of liquid.

According to a further embodiment, the container C comprises an annular container wall 200 around the container axis X and an auxiliary liquid aspiration duct 202, made entirely in said lateral wall of the container C.

In other words, the container wall 200 comprises a portion of functional wall 204, for example positioned head-on with the container, that is on the side destined for the liquid to come out, and an auxiliary wall 206, in one piece with the container wall 200, inside the container C, which runs along the portion of functional wall 204, so as to form with it the auxiliary liquid aspiration duct 202.

Said duct 202 is open near the bottom of the container, to aspirate the liquid contained in it.

Preferably, said duct 202 starts from an engagement mouth 208, axially distanced from the neck N of the container C.

The primary liquid aspiration duct 8, at least partially eccentric to the container axis X, is suitable for inserting in the engagement mouth 208 of the auxiliary liquid aspiration duct 202.

For example, advantageously, the primary liquid aspiration duct 8 comprises a first section 8a, which starts from the main surface 4a, having a first duct axis proximal to the container axis X and a second section 8b, adjacent to the first section 8a and terminating in the engagement mouth 208, distal to the container axis X.

Preferably, moreover, the primary liquid aspiration duct 8 comprises, in the terminal part suitable for insertion in the engagement mouth 208, a flexible coupling portion 210, made in a less rigid material than the material of the remaining part of the primary liquid aspiration duct 8.

Preferably, the flexible coupling portion 210 is made in one piece with the remaining part of the duct 8, for example by means of a co-moulding process.

For example, the flexible coupling portion 210 is made in Ethylene-Vinyl-Acetate (EVA) or in a material from the group of thermoplastic elastomers (TPE); the remaining part of the tube is rather made preferably made from high density polyethylene (PEHD).

Advantageously, this makes insertion of the duct 8 in the engagement mouth 208 particularly easy.

Preferably, moreover, the primary liquid aspiration duct 8 and the secondary liquid aspiration duct 50 are positioned on diametrically opposite sides the container axis X. In particular, for example, the first section 8a of the primary liquid aspiration duct 8 is completely contained on one side of the container axis X and the axial section 50a of the secondary liquid aspiration duct 50 is completely contained on the other side.

Innovatively, the dispenser device according to the present invention, despite having asymmetric components and off-axis ducts, retains considerable assembly simplicity.

In particular, advantageously, the head ensures a good seal with the container, thanks to the interposition of the auxiliary body between the frame and neck, of the container, made in particularly suitable material for forming a seal with the neck of the container.

Moreover, advantageously, the head ensures a good internal seal between the frame and auxiliary body, made in materials suitable for such purpose.

Advantageously, moreover, the dispenser device ensures aspiration of the air in the container preventing the leakage of liquid in said duct.

According to a further advantageous aspect, the dispenser device ensures aspiration of the air in the container preventing liquid from escaping from the air aspiration passage, for example when the device is inclined.

In particular, according to a further advantageous aspect, the connection system of the head and container is particularly suitable in the case of containers with liquid aspiration ducts built-in to the container, for which the built-in duct is strongly off-axis with the aspiration duct of the frame and therefore needs an intermediate fluidic connection structure.

It is clear that a person skilled in the art may make modifications to the dispenser device described above so as to satisfy contingent requirements, all contained within the sphere of protection as defined by the appended claims.

The invention claimed is:

1. A dispenser device for dispensing a liquid, comprising:
a container provided with a neck, destined to contain the liquid to be dispensed, wherein the neck extends along a container axis; and
a dispenser head attached to the neck of the container, comprising:
a) a frame comprising a support plate having a functional surface, the frame further comprising:
  i) a pressure chamber in which a piston slides sealingly along a pressure axis, and a dispenser duct, in fluidic communication with the pressure chamber, to dispense the liquid to the outside;
  ii) a secondary liquid aspiration duct extending from the functional surface and which is configured to be connected to the pressure chamber; and
  iii) a secondary air aspiration duct which is configured to be connected with the outside environment;
b) manual actuation devices operatively connected to the piston to move it in the pressure chamber;
c) an auxiliary body having a main surface and attached to the frame comprising:
  i) a primary liquid aspiration duct having an outlet disposed at the main surface and connected to a compartment inside the container, at least partially off-axis in relation to the secondary liquid aspiration duct; and
  ii) a primary air aspiration duct connected to the compartment inside the container;
wherein the functional surface and the main surface are axially spaced and form a joining compartment communicating upstream with the primary liquid aspiration duct and communicating downstream with the secondary liquid aspiration duct to form the fluidic connection between these; and
wherein the secondary air aspiration duct of the frame and the primary air aspiration duct of the auxiliary body overlap axially to form a seal to the liquid in transit in the joining compartment.

2. The device according to claim 1, wherein
said container comprises a lateral annular wall in which an auxiliary liquid aspiration duct is entirely made, open near the bottom of the container; and
wherein the primary liquid aspiration duct is configured to be connected to the auxiliary liquid aspiration duct of the container.

3. The device according to claim 2, wherein the container wall comprises a portion of functional wall and an auxiliary wall in one piece with the container wall, inside the container, which runs along the portion of functional wall, so as to form with it the auxiliary liquid aspiration duct.

4. The device according to claim 3, wherein said auxiliary duct extends downwards from an engagement mouth, axially spaced from the neck of the container.

5. The device according to claim 2, wherein the primary liquid aspiration duct comprises, in the terminal part suitable for connection with the auxiliary duct, a flexible coupling portion, made in a less rigid material than the material of the remaining part of the primary liquid aspiration duct.

6. The device according to claim 5, wherein the flexible coupling portion is made in one piece with the remaining part of the duct, for example by means of a co-moulding process.

7. The device according to claim 2, wherein the primary liquid aspiration duct comprises a first section, which extends from the main surface, having a first duct axis proximal to the container axis and a second section, adjacent to the first section and terminating in the auxiliary duct, distal to the container axis.

8. The device according to claim 1, wherein the auxiliary body is attached to the neck of the container.

9. The device according to claim 1, wherein the frame is sealingly attached in an airtight manner to the auxiliary body.

10. The device according to claim 1,
wherein the pressure chamber is annularly defined by a chamber wall; and
wherein the secondary air aspiration duct is configured to be connected with the outside environment by a hole through the chamber wall.

11. The device according to claim 1,
wherein in a rest configuration, the secondary air aspiration duct is fluidically separated from the outside environment by a seal formed on the piston.

12. The device according to claim 1,
wherein the primary air aspiration duct is eccentric to the container axis.

13. The device according to claim 1,
wherein the secondary air aspiration duct is eccentric to the container axis.

14. The device according to claim 1, wherein the secondary air aspiration duct and the secondary liquid aspiration duct are on opposite sides of the container axis.

15. The device according to claim 1, wherein the pressure axis is incident, in particular orthogonal, to the container axis.

16. The device according to claim 1, wherein the dispenser duct extends along a dispensing axis parallel and separate from the pressure axis.

17. The device according to claim 1, comprising:
a diaphragm dispenser valve; and
a diaphragm aspiration valve.

18. The device according to claim 1, comprising a translatable or rotatable trigger.

19. The device according to claim 18, comprising an elastic return, operatively connected to the piston or to the trigger.

* * * * *